Patented May 3, 1949

2,469,059

UNITED STATES PATENT OFFICE 2,469,059

OXIDIZED OLEFIN LIQUIDS

Amos Turk, Mount Lebanon, Pa., assignor of fifty per cent to Paul D. Boone, Washington, D. C.

No Drawing. Application September 18, 1944, Serial No. 554,727

11 Claims. (Cl. 260—406)

This invention relates to a process for the production of oxidized derivatives, more particularly the hydroxy derivatives of liquid monoenic or polyenic higher fatty acid nucleus compounds. This application is a continuation-in-part of my abandoned application, Serial No. 501,667, filed September 9, 1943.

It is an object of my invention to provide a process of reacting upon unsaturated higher fatty acids or the polyhydric alcohol esters of such acids, as for example, the glycerides, whereby a hydroxyl group is introduced without attacking the double bond. By the term "higher" herein is meant twelve or more carbon atoms.

More particularly it is an object of my invention to provide a synthetic method whereby the hydroxyl group is introduced onto a carbon atom of an unsaturated fatty molecule in the alpha position to a carbon to carbon double bond; this hydroxylated product is an unsaturated secondary alcohol. It is likewise an object to provide these type compounds.

It is also an object of my invention to provide a process whereby this unsaturated secondary alcohol may be converted into more highly oxidized olefinic compounds, such as unsaturated ketones.

Briefly stated, the above objects are accomplished by subjecting the non-conjugated liquid fatty polyene compound or a partially or wholly conjugated fatty polyene compound or a liquid fatty mono olefine compound to oxidation using selenium dioxide to introduce a hydroxyl group onto a carbon atom in the alpha position to a carbon to carbon double bond in said compound. Selenious acid ($H_2SeO_3$) which is formed from $SeO_2$ by the addition of water is less desirable than $SeO_2$. These hydroxylated products have many uses, some of which are set out below, but one of their paramount uses is to provide materials which upon dehydration yield conjugated polyene compounds, which are substitutes or replacements for dehydrated castor oil and China-wood oil (tung oil) or their fatty acids.

The hydroxylated unsaturated higher fatty acids and their esters of polyhydric alcohols of at least three hydroxyl groups of my invention differ structurally from ricinoleic acid and from air or permanganate oxidized oleostearic acid or linoleic or linolenic acid or their corresponding esters.

The structure of ricinoleic acid is

Neither the above structure nor the structure of air or permanganate oxidized oleostearic or linoleic or linolenic acids is an unsaturated alcohol of the same structure with respect to the relative positions of the hydroxyl group and the carbon to carbon double bond, as is that of applicant's oxidized product.

The course of my reaction may be explained as follows:

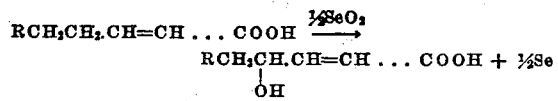

The ratio of selenium dioxide used for complete oxidation of the liquid olefine to the unsaturated secondary alcohol is one half mol of the oxide per mol of unsaturated fatty acid or ester thereof. Of course smaller amounts may be used if it is desired to oxidize only a portion of the material. But the process is not to be confused with oxidation employing catalytic proportions of selenium dioxide. Accordingly the use of less than one-tenth of the theoretical amount would not secure products containing sufficient hydroxyl content. The use of larger than one-half mol portion of selenium dioxide may cause the OH group to be further oxidized to a ketone group, rather than to introduce smoothly a second OH into the same molecule. These latter type products are unsaturated ketones. The conjugated olefine product from dehydration of the initial unsaturated secondary alcohol can be again oxidized by $SeO_2$ as indicated. The latter could be dehydrated. These multi-oxidized products, however, are monohydroxyl conjugated polyenes, wherein an olefine linkage is in the alpha position with respect to the hydroxyl group.

The oxidation can be carried out by heating the oily polyene liquid with the oxidizing agent either in the absence or in the presence of a solvent therefor or of a mutual solvent.

The purpose of the solvent in such a reaction is simply to provide a convenient medium in which to dilute, stir, or boil the reaction mixture. For example, if ethanol is used as a solvent, to form a dilute solution, and the reaction mixture is heated, the process takes place at about 78° C., the boiling point of ethanol. Selenium dioxide dissolves in the ethanol solution. If, instead of ethanol, one would similarly use toluene as a solvent for the oil and heat the mixture, the process would take place around 111° C., the boiling point of toluene. If no solvent at all were used, the reaction could be made to take place (at atmospheric pressure) at the same temperatures. The use of a solvent is somewhat more convenient, although not at all necessary, to the completion of the oxidation.

The starting materials used in my invention, that is to say, the materials with one or more double bonds, are liquid unsaturated carboxylic acids and their esters whether obtained synthetically or from natural sources, and also any other liquid monoenic or polyenic compounds contained in or derived from naturally occurring oils and fatty substances or artificially synthesized, which contain twelve or more carbon atoms in the acyl nucleus. Those containing at least sixteen and not more than thirty-two carbon atoms are preferred. These materials may be either individual compounds in a state of high purity or else mixtures which contain various mono- or polyene compounds, such as the mixtures found in nature. Such unsaturated compounds are in fact abundantly found in natural substances, and make up important animal and vegetable oils. These oils include such materials derived from nature as linseed oil, soy bean oil, perilla oil, sunflower oil, safflower oil, olive oil, and various suitable marine oils such as sardine, menhaden, pilchard and whale oils. Various members of the semi-drying oil class per se or freed in part or in toto from saturates may be used. The fatty acids thereof (either with or without fractionation) or equivalent artificial acids can also be used.

I shall describe my invention in more specific detail in the following examples. There are, of course, many forms of the invention other than these specific embodiments.

*Example 1*

100 parts by weight of linseed oil and 19.8 parts of powdered $SeO_2$ were dissolved in 140 parts of 95% ethyl alcohol. This ratio corresponds to one-half molecule of $SeO_2$ for each fatty acid chain of linseed oil, or sufficient of this oxide to hydroxylate each unsaturated fatty acid chain of the linseed oil molecule. The mixture was refluxed for three hours, during which time the oxide was consumed and metallic selenium was deposited. After the refluxing period, most of the alcohol was evaporated off and the product was dissolved in ether, then filtered. The ether was then evaporated from the filtrate, yielding the hydroxylated fatty oil product.

*Example 2*

The same procedure for cotton seed oil was carried out, employing 19 parts of powdered $SeO_2$.

*Example 3*

The selenium dioxide oxidation can be applied in the same way to the conjugated soy bean oil resulting from the dehydration of the hydroxylated oil product secured by the procedure described in Example 1 in reference to linseed oil. The dehydration is carried out in a conventional manner as by heating 100 parts of the initial hydroxylated oil for 20 minutes with 2 parts of "Celite" (amorphous light-weight, cellular, high absorptive diatomaceous earth) and 0.6 part of concentrated phosphoric acid until water is eliminated i. e. no more water evolved. When no more water comes off this is the sign that dehydration is complete. The liquid material is then filtered.

*Example 4*

The application of the selenium dioxide oxidation to olive oil exemplifies the application of this type of oxidation to a fatty or oily substance which is predominately mono-enic.

Moreover the formation of a product containing a conjugated system of double bonds from this mono-unsaturated starting material also shows that an OH group has been introduced onto a carbon atom in a position alpha to the carbon to carbon double bond. For were the OH group not in such a position, then two different unsaturated compounds would be represented in the dehydrated product. For the dehydration of ricinoleic acid in which the hydroxyl group is not on a carbon atom in the alpha position to a carbon to carbon double bond results in the formation usually of about 30% conjugated to 70% of the non-conjugated octadecadienoic acid. Whereas, if the structure of the original hydroxylated compound is such that the hydroxyl group is on the carbon atom in the alpha position to a carbon to carbon double bond, $$-CHOH.CH=CH-$$

then the dehydration can and does take place only in one direction, to produce a conjugated system of double bonds.

In practical operation, the selenium formed in finely divided or colloidal condition should be removed, as by aqueous solutions of alum or other electrolytes, or by adsorbents or other modes.

There are many uses to which the hydroxylated unsaturated fatty acids and esters thereof, such as the glycerides, produced by the processes, herein disclosed, may be put as such or after conversion to derivatives. The hydroxylated oils or hydrogenated derivatives thereof may be sulfated by sulfuric acid, oleum or treated with other sulfating or sulfonating agents. This type of derivatives can be used for such purposes as mordants in alizarine dyeing, wetting out or emulsifying agents in dyeing and finishing textiles, as a component in cutting oils and in the leather industry for the fat-liquoring of leather.

The sulfonated or sulfated hydroxylated oils or the sulfated blown hydroxylated oils subsequently mentioned or their fatty acids or derivatives thereof may be employed similarly as in the case of corresponding derivatives of castor oil as agents for de-emulsifying petroleum water-in-oil emulsions or in paper making or as cleaning agents or in other places where decrease of surface tension is important, such as a splitting agent in oil hydrolysis.

These hydroxylated oils may be used in the manufacture of softeners for cellulose ester lacquers, e. g. artificial leather finishes and airplane dopes. They can also be employed in the manufacture of imitation leathers, dressing for leather belting, sticky fly paper, typewriter inks, and in the case of the mono-enes as lubricants or hydraulic brake fluids in place of castor oil. They can be saponified to yield soaps, for several purposes. In the purified forms they can also be used in pharmacy as a hair oil or massage oil.

Blown derivatives can be made from the hydroxylated olefinic fatty acids or oils of this invention. Acid amides and blown amides of these hydroxylated olefinic fatty acids can be made. Such amides or blown amides can be formed by reacting these acids or their esters with monoethanolamine, diethanolamine, ethanol ethylene diamine, ethylene diamine or other amines or ammonia. The blown oils or other blown derivatives or even the unblown oils can be employed as plasticizers or agents for imparting flexibility more particularly in the cellulose ester finishes, lacquer paste colors, etc.

These hydroxylated unsaturated oils or the acids thereof may be acylated or peracylated. Esterification can be carried out with monobasic organic acids or polybasic acids such as phthalic, maleic or citric acids.

Resins or the Glyptal type may be made from these hydroxylated unsaturated oils or their acids in conjunction with the conventional polycarboxylic acid and conventional polyhydric alcohols.

While I have in the foregoing described in some detail the preferred embodiment of my invention and some variants thereof, it will be understood that this is only for the purpose of making the invention clearer and that the invention is not to be limited to the details of operation described. On the other hand, the invention is to be regarded as limited only by the terms of the accompanying claims.

I claim:

1. In the process of producing liquid oxidized compounds containing at least one olefine group, the steps of heating an oily liquid from the group consisting of olefinic unsaturated higher fatty acids and their gylceride esters with selenium dioxide in the ratio of not less than one-twentieth of a mol per mol equivalent of unsaturated higher fatty acid radical at not above substantially 111° C. in the presence of an organic solvent for one of the reacting components, whereby a CH₂ group adjacent an olefine carbon atom is oxidized to an alcohol group, and thereafter removing metallic selenium from the oily liquid.

2. In the process of producing liquid oxidized compounds containing at least one olefine group, the steps of heating an oily liquid from the group consisting of olefinic unsaturated higher fatty acids and their glyceride esters with selenium dioxide in the ratio of one-twentieth to one-half of a mol per mol equivalent of unsaturated higher fatty acid radical at not above substantially 111° C. in the presence of an organic solvent for one of the reacting components, whereby a CH₂ group adjacent an olefine carbon atom is oxidized to an alcohol group, and thereafter removing metallic selenium from the oily liquid.

3. In the process of producing liquid compounds containing a hydroxy group and at least one olefine group, the steps of heating liquid oily esters of olefinic unsaturated higher fatty acids and polyhydric alcohols of at least three hydroxyl groups with selenium dioxide in the ratio of one-twentieth to one-half of a mol per mol equivalent of unsaturated higher fatty acid radical at not above substantially 111° C. in the presence of an organic solvent for one of the reacting components, whereby an OH group is introduced onto a carbon atom in the alpha position to an olefine double bond, and thereafter removing the metallic selenium from the oily liquid.

4. In the process of producing liquid compounds containing a hydroxyl group and polyene groups, the steps of heating an oily liquid from the group consisting of polyenic higher fatty acids and their esters with polyhydric alcohols of at least three hydroxyl groups with selenium dioxide in the ratio of one-twentieth to one-half of a mol per mol of unsaturated higher fatty acid radical at not above substantially 111° C. in the presence of an organic solvent for one of these reacting components, whereby an OH group is introduced onto a carbon atom in the alpha position to an olefine double bond, and thereafter removing the metallic selenium from the oily liquid.

5. Oily liquid esters of glycerol and polyenic higher fatty acids, in which some of these fatty acid radicals of the ester molecule have a hydroxyl group on a carbon atom in the alpha position to an olefine double bond.

6. Oily liquid esters of polyhydric alcohols of at least three hydroxyl groups and polyenic higher fatty acids, in which some of these fatty acid radicals of the ester molecule have a hydroxyl group on a carbon atom in the alpha position to an olefine double bond.

7. Oily liquids of the group consisting of polyenic higher fatty acids and the esters of polyhydric alcohols of at least three hydroxyl groups and polyenic higher fatty acids, in which the fatty acid radicals have a hydroxyl group on a carbon atom in the alpha position to an olefine double bond.

8. Liquid oxidized linseed oil in which some of the olefinic unsaturated fatty acid radicals of the oxidized ester molecule have a hydroxyl group on a carbon atom in the alpha position to an olefine double bond.

9. Oily liquids of the group consisting of di- and tri-enic higher fatty acids and the esters of polyhydric alcohols of at least three hydroxyl groups and such polyenic higher fatty acids, in which the fatty acid radicals have a hydroxyl group on a carbon atom in the alpha position to an olefine double bond.

10. Oily liquid mixed esters of glycerol and di- and trienic higher fatty acids, in which some of these fatty acid radicals of the ester molecule have a hydroxyl group on a carbon atom in the alpha position to an olefine double bond.

11. Oily liquid mixed esters of polyhydric alcohols of at least three hydroxyl groups and di- and trienic higher fatty acids, in which some of these fatty acid radicals of the ester molecule have a hydroxyl group on a carbon atom in the alpha position to an olefine double bond.

AMOS TURK.

REFERENCES CITED

The following references are of record in the file of this patent:

UNITED STATES PATENTS

| Number | Name | Date |
| --- | --- | --- |
| 2,165,530 | Bertram | July 11, 1939 |
| 2,217,516 | Houpt | Oct. 8, 1940 |
| 2,367,050 | Price | Jan. 9, 1945 |